United States Patent [19]
Silverman et al.

[11] 3,993,974
[45] Nov. 23, 1976

[54] SEISMIC METHOD FOR DETERMINING THE POSITION OF THE BIT ON A DRILL STEM IN A DEEP BOREHOLE

[75] Inventors: Daniel Silverman; John R. Bailey, both of Tulsa, Okla.

[73] Assignee: Senturion Sciences, Inc., Tulsa, Okla.

[22] Filed: June 3, 1974

[21] Appl. No.: 475,590

[52] U.S. Cl. .................. 340/15.5 MC; 181/102; 181/119; 181/120
[51] Int. Cl.² .................. G01V 1/14; G01V 1/38
[58] Field of Search .......... 181/102, 106, 116, 118, 181/119, 120; 340/18 NC, 18 DC, 15.5 MC; 175/1, 40, 45, 237; 166/308; 73/151

[56] References Cited
UNITED STATES PATENTS

| | | | |
|---|---|---|---|
| 2,238,895 | 4/1941 | Gage | 175/317 |
| 2,281,751 | 5/1942 | Cloud | 175/1 |
| 2,461,727 | 2/1949 | Gardner | 175/237 |
| 2,770,312 | 11/1956 | Silverman | 181/106 |
| 2,898,084 | 8/1959 | Eckel et al. | 175/1 |
| 2,933,144 | 4/1960 | Scott et al. | 340/18 LD |
| 3,020,964 | 2/1962 | Graham et al. | 175/237 |
| 3,268,859 | 8/1966 | Watts | 340/15.5 MC |
| 3,645,331 | 2/1972 | Maurer et al. | 175/237 |
| 3,645,346 | 2/1972 | Miller et al. | 175/237 |
| 3,804,182 | 4/1974 | Adair et al. | 175/237 |
| 3,817,345 | 6/1974 | Bailey | 340/15.5 MC |

*Primary Examiner*—Howard A. Birmiel
*Attorney, Agent, or Firm*—Head, Johnson & Chafin

[57] ABSTRACT

A method for determining the precise position of the drill bit on the bottom of a long drill string in a deep borehole in the earth during a drilling operation, with a minimum of effort and interruption of the drilling process. It provides placing a plurality of geophones in an array on the surface of the earth above the expected position of the drill bit. A frangible object is inserted into the drill pipe near the surface whereby the mud stream will carry it down through the pipe to the bit where it will close off the mud flow through the bit. The mud pressure above the object will increase and when it reaches a high enough value the object will shatter and there will be a sudden flow of mud through the openings of the bit in the form of a shock wave, which will generate a seismic wave in the earth at the location of the bit. The expanding seismic wave will be detected by the geophones at the surface from which the times of arrival at the various geophones can be determined. The time of initiation of the shock wave can be determined from which the travel times of the seismic wave can be determined and, therefore, the position of the bit with respect to the geophones can be determined.

22 Claims, 2 Drawing Figures

3,993,974

SEISMIC METHOD FOR DETERMINING THE POSITION OF THE BIT ON A DRILL STEM IN A DEEP BOREHOLE

CROSS REFERENCES TO RELATED APPLICATIONS

It is related to U.S. Pat. No. 3,739,871, entitled "MAPPING OF EARTH FRACTURE INDUCED BY HYDRAFRACTURING," which is hereby entered into this application by reference. This application is also related to two other applications by the same inventors as this application and filed in the Patent Office on the same date as this application, entitled "SEISMIC METHOD FOR DETERMINING THE POSITION IN THE EARTH OF THE BOTTOM END OF A LONG PIPE SN 475,481"; and "SEISMIC METHOD FOR LOGGING POSITION OF A DEEP BOREHOLE IN THE EARTH SN 475,589."

BACKGROUND OF THE INVENTION

This invention is in the field of elastic wave generation transmission and detection in the earth. More particularly, it is concerned with determining the position in the earth of the drill bit during a drilling operation in a deep borehole. Still more particularly, it concerns determination of the velocity of elastic waves in the earth.

Alternatively, this invention is concerned with initiation of a seismic wave at a selected shallow depth in a water layer overlying the earth's surface for the purpose of determining the geologic structure of the earth to a selected depth below the water-earth interface.

In the prior art, various means have been devised for determining the position of the borehole in the North-South, East-West coordinates, at selected depths during a drilling operation. This has been done by using survey instruments specially designed for introduction into the borehole and sometimes introduced into the drill pipe, which by their internal mechanism make a record of the slope (or angle with the vertical) of the borehole at each of a plurality of selected depths and a measure in relation to the magnetic compass of the azimuth of the slope of the borehole. Knowing the direction of slope and magnitude of slope at each of a plurality of selected known depths and assuming that the borehole is straight inbetween the survey points at which the measurements are made, the profile of the borehole in three dimensions can be plotted.

One serious disadvantage of this particular system is that it requires a stoppage of the drilling process so that the drill pipe can be broken and the survey instruments inserted on a wire line into the drill pipe. Since the cost of operation of the drill rig runs into many thousands of dollars a day, time loss from the drilling operation to make these measurements is extremely expensive. There is understandable reluctance on the part of drillers to make these necessary measurements so that at some future time when this knowledge is needed it will not be available and cannot be easily obtained.

SUMMARY OF THE INVENTION

It is a primary object of this invention to provide a simple and inexpensive means for determining at any selected time, a measurement indicative of the position of the bit in a borehole during a drilling operation.

It is a further object of this invention to provide a method of determining the position of the bit in a borehole without interrupting the drilling operation.

It is a further object of this invention to provide a method of determining the velocity of propagation of elastic waves in the earth in the vicinity of the drill bit.

These and other objects are realized and the limitations of the prior art are overcome in this invention by providing a plurality of geophones or other elastic wave earth motion detectors, placed on the surface of or in the earth. A frangible or other object is inserted into the drill pipe at the surface and the mud flow carries this object down through the drill pipe to the drill bit. The shape of the object is such that it covers and seals the openings through the drill bit and prevents the flow of mud, causing the pressure in the mud above the object to increase to a point where the object shatters, suddenly opening the passage through the drill bit and generating a shock wave as the compressed liquid which suddenly expands through the openings in the drill bit. The shock wave generates a seismic wave in the earth which expands outwardly from the bit and eventually reaches the geophones placed on the surface. From conventional seismic records taken of the geophone responses, the times of arrival of the elastic wave can be determined.

BRIEF DESCRIPTION OF THE DRAWINGS

These and other objects of this invention and a better understanding of the principles and details of the invention will be evident from the following description taken in conjunction with the appended drawings in which.

DESCRIPTION OF THE PREFERRED EMBODIMENT

U.S. Pat. No. 3,739,871, entitled "MAPPING OF EARTH FRACTURE INTRODUCED BY HYDRAFRACTURING" and copending application Ser. No. 371,142, now U.S. Pat. 3,817,345, entitlted "CONTINUOUS BIT POSITIONING SYSTEM," have been entered into this application by reference. Both of these include a full and complete description of the manner of placing of geophones in the earth detecting the geophone signals indicating the arrival of a seismic wave generated at the bit. Amplifying and recording the geophone signals and determining the travel times of the seismic wave and determining the position of the bit with reference to the known positions of the geophones has been fully covered. Reference is made to these patents for full details of this portion of the description of the invention.

In copending application Ser. No. 371,142 the generation of the seismic wave was accomplished by raising the drill string in the borehole a selected short distance and permitting it to drop, so that the bit would impact on the bottom of the borehole and create a compressional wave in the earth, which would travel to the geophones and be detected.

In this application a different method of initiation of the seismic wave is described which, while it utilizes a drill pipe and drill bit and mud flowing through the pipe and into the annulus of the well bore, does not require that the bit be positioned on bottom. Therefore, this method can be carried out whatever the position of the bit in the borehole.

Figure 1:
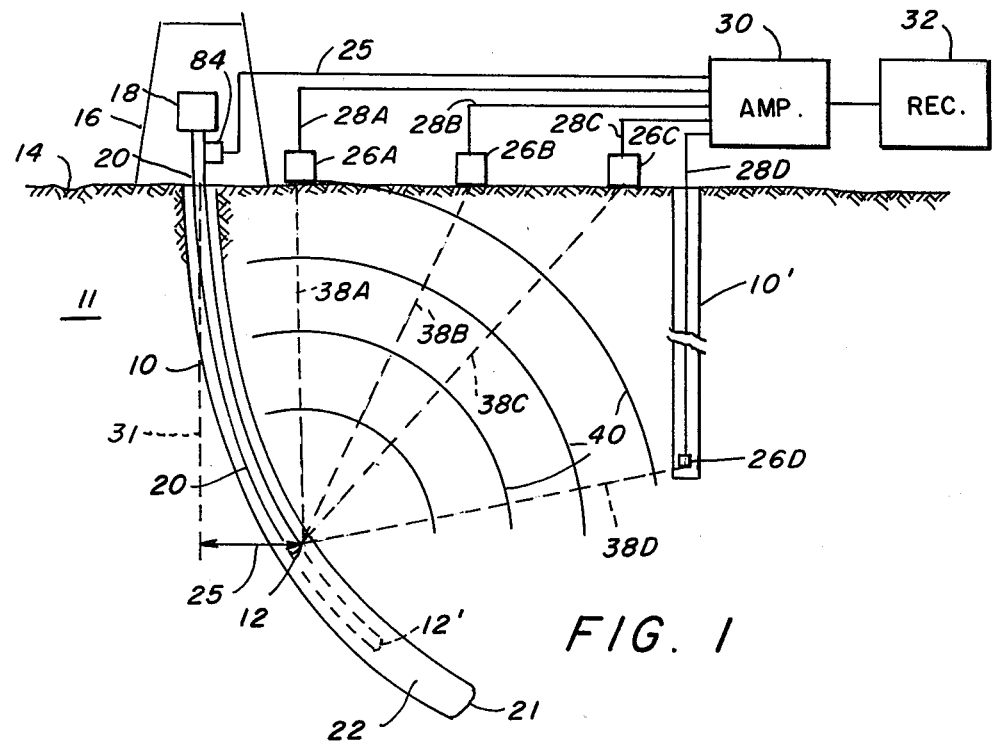
FIG. 1 represents in schematic form a cross section of the earth including a borehole and drill pipe in the borehole and a plurality of geophones on the surface including amplifying and recording instruments.

Referring now to the drawings there is shown in FIG. 1 a borehole 10 drilled into the earth 11 having a curvature of unknown magnitude, such that the lateral position 25 of the borehole at any depth is not known. A drill pipe 20 is inserted into the borehole and extends to the point 12 which may be at or some distance above the bottom 21 of the borehole. At the surface 14 there is a derrick structure 16 of conventional form, required for handling the pipe in the borehole in conventional manner (not shown). There is a structure 18 on the pipe at the surface by means of which a frangible object, such as a sphere or cylinder of glass, plastic, ceramic, etc. can be introduced into the inside of the drill pipe and which will fall in the drill pipe with the flow of the mud, carrying it down to the bit.

Figure 2:
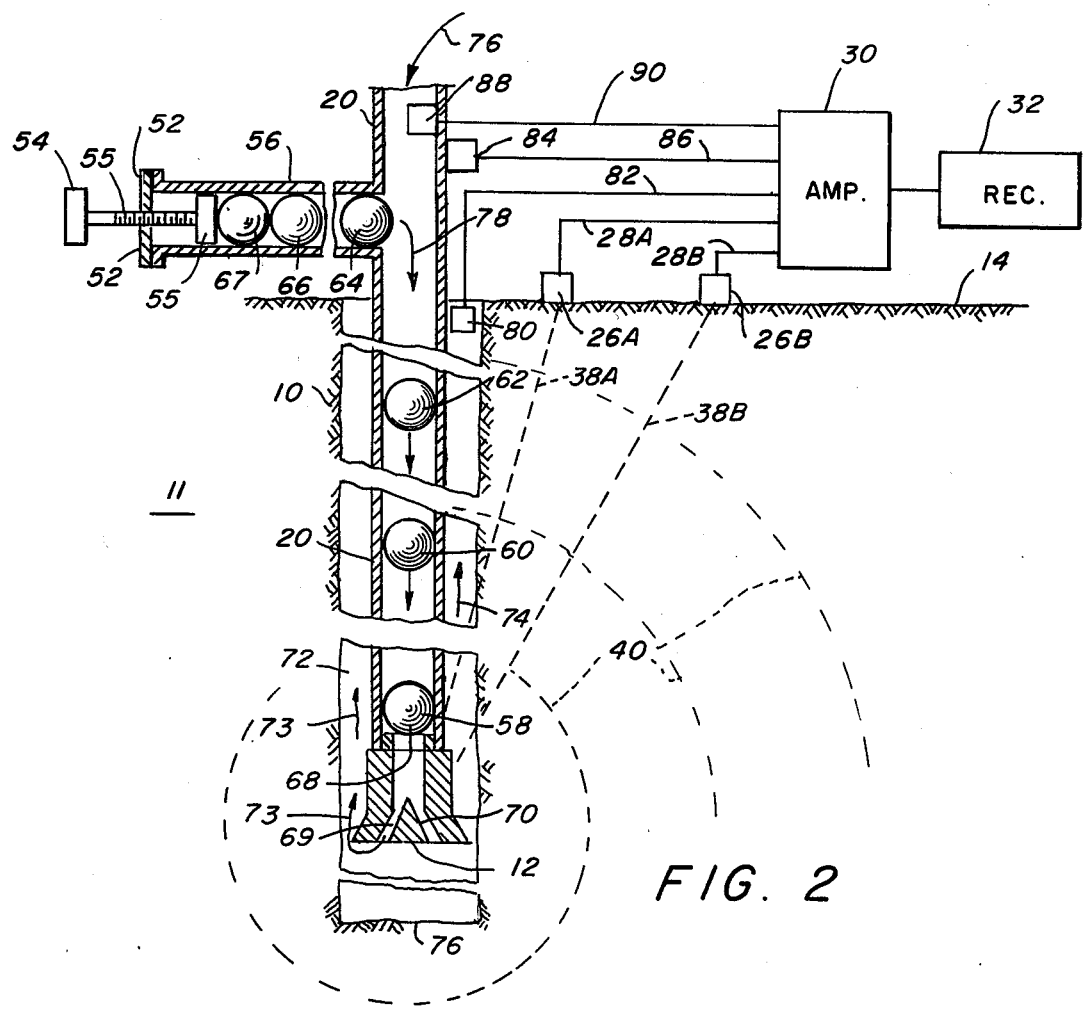
FIG. 2 illustrates one manner in which one or a plurality of frangible objects can be inserted into the drill pipe at the surface of the earth.

In conventional bits shown in FIG. 2, there are one or more water courses 69, 70 through the bit by means of which the mud passes from the drill pipe through the opening 68 and the water courses 69, 70 and jets into the borehole, removing cuttings off the bottom of the borehole and carrying them up to the surface through the mud flow up the annulus between the pipe and the wall of the borehole.

The frangible objects such as 58, are designed so that when they reach the drill bit they will seal off the opening 68 and the water course 69, 70 through the bit. Preventing the flow of water or mud through the bit will cause the pressure in the mud in the pipe 20 above the object to rise and the water to be compressed. As the pressure rises a magnitude of pressure is finally reached where the object 58 will shatter and crumble into many small pieces, and the compressed liquid will thereupon, in shock wave fashion, explosively expand out through the openings 68, 69, 70 in the bit and generate an elastic wave, or seismic wave 40 in the earth. This wave 40 would be generated at the point 12, which is the bottom end of the pipe, or the bit, and the seismic wave will expand outwardly as a series of spherical surfaces 40 which eventually reach the surface and are detected by each of a plurality of geophones or other vibration sensors 26A, 26B, 26C, 26D, etc., which may be positioned on the surface in a selected two dimensional pattern or in the earth in a three dimensional pattern. These geophones are connected by cables 28A, 28B, 28C, 28D, etc., in conventional manner to conventional seismic amplifiers 30 and to a conventional seismic recorder 32, either photographic or magnetic.

The array of geophones may include one or more geophones such as 26D positioned in a deep borehole 10'. Thus, the array of geophones may be in a two or three dimensional array as desired. They should, however, be in at least a two dimensional array, so as to be able to locate the position of the point 12 in two dimensions, knowing the length of the pipe 20 which gives the third dimension.

A sensor 84 is shown attached to the pipe 20 at the surface and connected by a cable 25 to the amplifier 30. This is for the purpose of detecting the elastic wave generated in the drill pipe at the bit, by the shattering of the object 58. Knowing the velocity of propagation of elastic waves in the pipe and determining the time of arrival of the elastic wave at the sensor 84 the time of generation of the shock wave or the seismic wave, at point 12 can be determined.

Knowing the time of initiation of the seismic wave and of its arrival at the various geophones, the travel times can be determined. Knowing the length of drill pipe in the hole, which corresponds to the depth of the point 12, the lateral position 25 of the point 12 with respect to the known positions of the geophones can be determined.

FIG. 1 is a purposely distorted picture of the actual condition in a borehole. Normally, the lateral position 25 of the point 12 with respect to the vertical axis of the pipe at the surface is small, so that the depth of the point 12 below the surface can be taken as the length of the drill pipe. Therefore, knowing the depth of the point 12 its lateral position can be determined.

Normally, in surveying the position of the borehole it would be carried out in the form of a series of tests of the type outlined. These tests would be started at a relatively shallow depth of the borehole, before it had been deviated to any great extent, in which case the length of the pipe in the borehole would determine the depth of the point 12. As successive depths are reached and additional determinations are made a correction can be provided from information derived in previous tests, so that knowing the length of the pipe the true depth of the drill bit can be determined. In other words, when the deviation is slight the length of pipe determines the depth of the bit. As the depth and deviation increase, the information on position location at the shallower depths can provide a truer measure of depth from the known length of the drill pipe. Therefore, all that is needed besides the length of the pipe is the travel time of the elastic wave in the earth from the drill bit to the geophones. Having this information the process of computation outlined in copending application Ser. No. 371,142 indicates how the position determination is made.

Referring to FIG. 2 there is shown one means for inserting a frangible object such as a sphere 64 into the drill pipe at the surface. This can generally be done above the swivel so that there would be no rotation of the side pipe 56 shown. FIG. 2 shows a borehole 10 in the earth 11, having a surface 14. A drill pipe 20 extends from a point above the surface down into the borehold. The pipe is termianted by a bit indicated schematically by the numeral 12. Since the initiation of the seismic wave does not involve striking the bit on the bottom 76 the measurement outlined by this description can be carried out with the bit at any position in the borehole. The bit 12 is shown with two water courses 69 and 70 starting from a central opening 68 in the top of the bit. This is all conventional.

An object such as a hollow sphere 58 is inserted in the drill pipe at the surface. This can be done while the drill pipe is broken during the process of adding a new section of pipe. In other words, when the pipe is broken, the frangible object 58 is inserted in the drill pipe. The new length of pipe is attached and the drilling process resumed. As the mud flows down through the drill pipe in accordance with arrow 76, the sphere 58 is carried down to the bottom and eventually seats on the top of the drill bit closing off the opening 68. The mud flow now stopped by the blockage of the opening 68 continues to flow in at the surface, compressing the water and building up the pressure above the object 58. As the pressure rises to a critical point the object will crumble and break into a plurality of small pieces uncovering the opening 68 and permitting the highly compressed liquid to explosively expand through the water courses 69 and 70 into the borehole below the bit 12. This explosive flow of liquid will generate an elastic wave, or seismic wave, in the earth which will expand in accordance with the spherical surfaces 40 and eventually reach the geophones as indicated previously.

The shock wave generated at the bit will initiate an elastic wave up the mud in the pipe, where it will be detected on a sensor 88 which would preferably be a pressure sensor, the output of which would go by leads 90 to amplifier 30. There will also be an elastic wave which will travel up the mud column in the annulus of the well to the sensor 80 which is inserted in the mud column near the surface. The output of this sensor 80 which preferably would be a pressure sensor goes by lead 82 to the amplifier 30. There is also an elastic wave generated in the pipe itself due to the sudden relaxation of the stress in the pipe and this would travel up the pipe at known velocity of propagation, to an appropriate vibration sensor 84 attached to the pipe, the output of which would go by leads 86 to the amplifier 30.

The outputs of one or more of the three sensors 88, 84 and 80 are amplified in the amplifier 30 and recorded in the recorder 32. From such a record the actual times of arrival of these elastic waves can be determined. Knowing the velocity of propagation in the mud and in the pipe the instant of initiation at the bit can be determined since the length of pipe is known. By this means, the timing of the initiation of the seismic wave can be determined and, therefore, the travel time of the seismic wave along the cords 38A, 38B, etc., to the geophones 26A, 26B, etc., can be determined. From the known positions of the geophones and the known travel times, and the known depth of the bit, the lateral position of the bit can be determined.

In FIG. 2 is shown a side pipe 56 attached as by welding to the drill pipe or the mud line 20. The side pipe 56 is of such size that a plurality of frangible objects such as spheres 64, 66, etc. can be positioned in the side arm by removing the plate 52 inserting the spheres 64, 66, 67, etc. and placing the plate 52 back to seal the pipe 56. Means indicated generally by the arrow 54 and pusher plate 55 can be used to force the balls outwardly into the vertical pipe, where the mud flow will carry them, down, in accordance with the arrow 78 and as indicated by the series of balls 58, 60 and 62. There are other ways possible also for introducing the spheres into the drill pipe, but the two which have been described can be used in almost all of the circumstances that would be encountered.

Consider the case of a single object such as 58 flowing down the mud line. As the mud column moves carrying the sphere down, it is suddenly stopped at the bottom by the sphere blocking the opening 68, the flow out of the bottom of the pipe is stopped and the mud on top of the sphere starts to be compressed. The inertia of the mud column is very great and the movement of the mud can only be stopped by exerting a back pressure, which is due to the compression of the mud itself.

This is well known as a water hammer phenomenon. Depending upon the length and rigidity of the pipe and the compressibility of the liquid, very high pressures can be generated by suddenly stopping the flow. It is quite likely, therefore, that as soon as the sphere hits bottom, stopping the flow, the water hammer effect will create a very sharp rise in pressure to a very high value, which will cause the sphere to rupture and disintegrate, releasing this very high pressure as a shock wave into the earth.

However, it is immaterial whether the pressure rises as a direct result of the water hammer effect, or whether it rises as a result of continued operation of the pumps at the surface forcing more and more water into the pipe and compressing it, and raising the pressure in the pipe throughout its length, such pressure breaking the object. The important thing is that for a short interval of time the mud flow is stopped, a sharp rise in pressure flows and when the subject breaks, the shock wave is generated by the explosive expansion of the mud.

We have shown in FIG. 2 a plurality of spherical objects falling in the mud stream. These can be inserted at irregular time intervals, so that there will be not only one shock wave and seismic wave generated, but a time-spaced series of shock waves and corresponding seismic waves generated. This time spaced series of seismic waves will be detected and recorded at the surface. The travel times can be determined more precisely in this case by correlating the received signals with the time patterns of shock waves or seismic waves in the earth. This is a well known procedure for improving signal to noise ratio in systems of this sort and needs no further description. The important point is that apparatus is provided for creating a plurality of seismic waves in selected random time patterns. The time pattern would be detectable on the sensors 180, 184 and 188 giving a time pattern with which the received signals can be correlated.

In this application we have described our invention in terms of a drill pipe terminated in a bit. However, it could be just as well any kind of pipe, with a restricted opening at the bottom and any sort of object which will flow down the pipe and close the opening. The closure must be temporary, after which it is opened as the result of the resulting high pressure. The opening can be breakage of the object--such as a frangible material. Or it can also be by means of a deformable material and an orifice of smaller size than the sphere. Once the sphere closes the smaller opening, the pressure rises to the point where the sphere is deformed so as to pass through the opening or the sphere is sheared off and permitted to pass through.

Thus any kind of object which can temporarily close off an aperture such that under higher pressure the object is removed, can be used. Such objects can be frangible, deformable, shearable, etc. Rubber balls could, of course, be used for this purpose.

Also, while we mention frangible objects, we mean more generally, any objects which block the lower opening at a first pressure but can be made to pass through the orifice and open it at a higher second pressure. Passing through may be by breakage into small pieces, shearing, or by deformation.

Also, while we speak of elastic waves in the earth we mean also seismic waves, compressional waves, etc. Thus, when the opening is suddenly closed by the object a very high pressure builds up on top of the closure, while a negative or relaxation wave is generated below the bit. This relaxation wave forms a seismic wave of negative phase, which can be detected by the geophones.

Also, while we mention geophones, which are conventional seismic wave detectors, any other well known sensors such as displacement, velocity, acceleration and other detectors can be used as is well known in the art.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

We claim:

1. The method of locating the position in the earth of the bit on the bottom of a drill string in a deep borehole, comprising the steps of:
    a. positioning a plurality of geophones in the earth in a multi-dimensional array in known positions, with respect to the surface end of the borehole and amplifying and recording the electrical signals generated by said geophones while transducing seismic waves in the earth;
    b. pumping water down the drill pipe, through the bit, into the borehole and up the annulus;
    c. near the surface of the earth inserting into the drill pipe an object such that will travel down the drill pipe with said water until it reaches the bit, where it will substantially block the passage of said water through the openings through the bit, whereby the pressure in the water above said object will rise;
    d. permitting said pressure in said water in said pipe to rise until said object is forced through said openings, generating a shock wave as the highly compressed water expands through said bit into the borehole, generating an expanding seismic wave in the earth;
    e. detecting the arrival of said seismic wave at each of said plurality of geophones and determining the times of arrival;
    f. from the known times of arrival of the seismic wave at said geophones and the known length of pipe, determining the position in the earth of said bit.

2. The method of claim 1 including the additional step before step (f) of determining the times of arrival at the surface, by suitable sensor means of the elastic wave set up in the water in the pipe, by the shock wave at the bit; and determining therefrom, and the known length of pipe, the time of initiation of said seismic wave.

3. The method as in claim 1 including the additional step before step (f) of determining the time of arrival at the surface by suitable sensor means, of the elastic wave set up in the water in the annulus, by the shock wave at the bit and determing therefrom, and the known length of pipe the time of initiation of said seismic wave.

4. The method as in claim 1 including the additional step before step (f) of determining the time of arrival at the surface by suitable sensor means of the elastic wave set up in the drill pipe by the shock wave at the bit and determining therefrom and the known length of pipe the time of initiation of said seismic wave.

5. The method as in claim 1 in which said object is a closed container made of frangible material.

6. The method as in claim 5 in which said frangible material is glass.

7. The method as in claim 5 in which said frangible material is plastic.

8. The method as in claim 6 in which said frangible material is ceramic.

9. The method as in claim 1 in which said object is a frangible disc-like object.

10. The method as in claim 1 in which said object is a deformable object which is too large to pass through said opening at normal pressure, but will be deformed by a sufficiently high pressure so as to pass through said opening.

11. The method as in claim 10 in which said object is a hard rubber ball.

12. The method as in claim 1 in which said object is larger than said opening, which, when the pressure is sufficiently high will be sheared off and forced through said opening.

13. The method as in claim 1 in which step (d) includes the additional step of inserting a plurality of objects spaced apart in vertical position as they travel down the drill pipe and including the additional step of correlating the received seismic signals with a function of the time pattern of seismic waves generated by the succession of objects.

14. The method of locating the position in the earth of the bottom end of a long pipe in a deep borehole, the bottom of said pipe partially closed by a closure having an opening, comprising the steps of:
    a. positioning a plurality of sensors in the earth in a multi-dimensional array in known positions, with respect to the surface end of the borehole and amplifying and recording the electrical signals generated by said sensors while transducing seismic waves in the earth;
    b. pumping a liquid down said pipe, through said opening, into the borehole and up the annulus;
    c. near the surface of the earth inserting into said pipe an object such that will travel down said pipe with said liquid until it reaches said opening, where it will substantially block the passage of said liquid through said opening, whereby the pressure in said liquid above said object will rise;
    d. permitting said pressure in said liquid in said pipe to rise until said object is forced through said opening, generating a shock wave as the highly compressed liquid expands through said opening into the borehole, generating an expanding seismic wave in the earth;
    e. detecting the arrival of said seismic waves at each of said plurality of sensors and determining the times of arrival;
    f. from the known times of arrival of the seismic wave at said sensors and the known length of pipe, determining the position in the earth of said bottom end of said pipe.

15. The method as in claim 14 including the additional step before step (f) of determining the time of arrival at the surface, by suitable sensor means of the elastic wave set up in the water in the pipe, by the shock wave at said opening and determining therefrom, and the known length of pipe, the time of initiation of said seismic wave.

16. The method as in claim 14 in which said rise of pressure in said pipe above said object is due to water hammer resulting from the sudden closing of said opening.

17. Apparatus for generating at a series of time-spaced instants, a series of seismic waves at a selected depth in a body of water, comprising;

a. a rigid walled pipe long enough to reach from the surface of said body of water to said selected depth;

b. means to provide a continuing rapid flow of water under pressure through said pipe from the surface end to the bottom end of said selected depth;

c. means at said bottom end of said pipe at said time spaced instants to suddenly close said bottom end and to stop said flow of water; whereby the pressure of said water at said bottom end will suddenly rise; and d. means solely responsive to said sudden rise in pressure to promptly and suddenly open said bottom end;

whereby said water will explosively expand through said opening into the surrounding water, generating a seismic wave.

18. The apparatus as in claim 17 in which said means to close said bottom end comprises a plurality of objects flowed down said pipe at said time-spaced instants with said water from said surface end, said objects adapted to temporarily seal across an orifice in a closure across the bottom end of said pipe.

19. The apparatus as in claim 18 in which said means to open said bottom end comprises said plurality of objects, which responsive to said sudden rise in pressure are adapted to be altered so as to pass through said orifice.

20. The apparatus as in claim 18 in which said object is a hollow frangible container, adapted under said sudden rise in pressure to be ruptured into small pieces to pass through said orifice.

21. The apparatus as in claim 18 in which said object is a deformable body adapted under said sudden rise in pressure to be deformed so as to pass through said orifice.

22. The apparatus as in claim 18 in which said object is a body adapted to be sheared, due to said sudden rise in pressure, to a size such that it will pass through said orifice.

* * * * *